Dec. 28, 1937.　　　　D. H. HILL　　　　2,103,904
HUMIDITY AND TEMPERATURE CONTROL SYSTEM
Filed Feb. 5, 1937
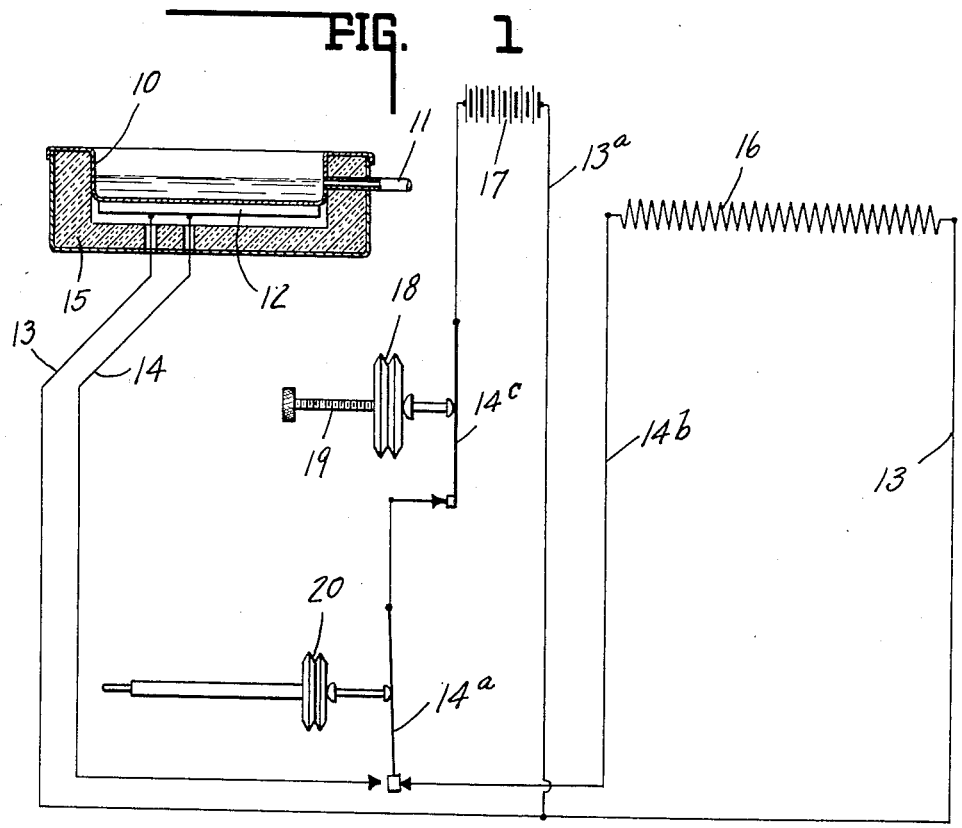
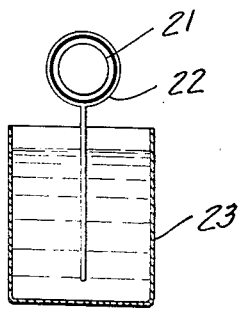
INVENTOR.
DEWEY H. HILL.
BY
Lockwood Goldsmith & Galt
ATTORNEYS.

Patented Dec. 28, 1937

2,103,904

UNITED STATES PATENT OFFICE 2,103,904

HUMIDITY AND TEMPERATURE CONTROL SYSTEM

Dewey H. Hill, Macomb, Ill., assignor to Globe American Corporation, Kokomo, Ind., a corporation Application February 5, 1937, Serial No. 124,187

3 Claims. (Cl. 236—44)

This invention relates to a humidity and temperature control system particularly adaptable and designed for use in connection with mammoth incubators wherein it is desired to maintain a substantially constant and predetermined temperature and relative humidity, although the invention may have other applications.

The object of the invention is to automatically and without manual attention maintain a constant and relative humidity through the medium of a simple and cheaply constructed installation which will most effectively and efficiently utilize the electric current in heating and eliminate extra humidifying mechanisms, fans, motors and the like.

One feature of the invention resides in applying heat to the water to increase the relative humidity while utilizing such heat for temperature requirements along with a dry heating element, both the humidifying heater and the dry heater being controlled by the same circuit and temperature control device. Thus there is no waste of current or power in creating humidity in addition to creating heat.

The full nature of the invention will be readily understood from the accompanying drawing and the following description and claims:

Fig. 1 is a diagrammatic illustration of the method and system employed. Fig. 2 is a section through the wet bulb of the humidity control.

In the drawing, there is shown a water pan 10 in which there is a constant level of water maintained through any suitable medium, such as a float controlled valve, not shown herein, the water being introduced through the water inlet 11. Below and immediately adjacent the underside of the bottom of the pan there is provided a heating element 12 of any suitable character which is electrically energized by the lead lines 13 and 14. Surrounding the pan 10 and enclosing the heating element there is provided an insulating wall 15 for causing the major portion of the heat generated by the element 12 to be absorbed by the metal pan 10 and the water therein. Said pan operates as a steam vapor generator, practically all of the heat from element 12 being first absorbed by the water through the pan, the water giving off steam vapor, raising the relative humidity within the compartment in which it is placed. The sensible heat from the vapor is in turn given up to the air within the compartment, thereby raising the temperature. The water pan will, therefore, generate both heat and humidity into the compartment in which it is placed.

Associated with the water pan, but spaced therefrom in a suitable location of the compartment, there is a dry heating element 16 of any suitable and efficient design. The lead line 13 is connected to one terminal of the heating element 16 as well as the heating element 12 and leads through the line 13a to one terminal of the source of current supply 17. The line 14 connects the other terminals of the heating elements 12 and 16 through the single pole, double throw switch 14a and the line 14b. The switch 14a is of the snap action type having no neutral position when at rest. The pole of said switch 14a is connected to the other terminal of the source of current 17 through the single pole, single throw switch 14c.

Thus, for either heating element to be energized the switch 14c must be closed and the switch 14a determines which of the two elements will be energized at a given time.

The switch 14c is controlled by a dry temperature thermostat 18 of any suitable design, that indicated herein being of the wafer type having a temperature setting screw 19 associated therewith. Thus, upon an increase of dry temperature, the wafers of the thermostat 18 will be expanded to open the switch 13c and break the circuit to both heating elements. Upon the temperature being lowered to or below a predetermined dry temperature, the wafers will contract to permit closing of the switch and energizing one or the other of said heating elements.

The humidity control is of the usual type and is indicated at 20. As illustrated herein, the control may be of that character embodying a series of wafers connected with a tube 21 (Fig. 2) surrounded by a fabric blanket 22 extending into the water supply contained in a vessel 23, the tube and wafers being filled with volatile liquid affected as to its expansion and contraction by the cooling due to evaporation of moisture from the blanket.

In operation, heat will be supplied to the compartment from either of the heating elements 12 and 16. When the element 12 is energized, the water in the pan 10 will be heated so that warm vapor will rise to increase the relative humidity and the temperature. By means of dry temperature thermostat 18 and the setting thereof, a predetermined dry temperature will thus be maintained through the medium of both of said elements. If the relative humidity falls below the setting of the wet bulb thermostat 20, the switch 14a will contact with the line 14 leading to the humidifying heating element 12, breaking the circuit through the line 14b to the dry heating element 16. Heat and moisture will thus be generated from the pan 10. If the heat passes the predetermined temperature set in accordance with the dry temperature thermostat 18, the switch 14c will be opened so as to discontinue any heating effect by either heating element. If the relative humidity rises above the prescribed amount but the dry temperature requires raising, the switch 14c will be closed and the wet bulb thermostat 20 will move switch 14a to close the circuit through line 14b to the dry heating element 16.

Thus, it will be apparent that all current consumed will be effective to build up and maintain both the temperature and humidity within the compartment without the use of outside or motor driven mechanisms.

The invention claimed is:

1. In a humidity and temperature control system for incubators, a water evaporating pan having an electric heating element therefor, a dry heating element, an electric circuit including a source of current common to said elements, a dry temperature thermostat for controlling said electric circuit and a humidity control thermostat for simultaneously making said circuit with one element and breaking it with the other.

2. In a humidity and temperature control system for incubators, a vapor producing electric heating element, a dry heat producing electric heating element spaced therefrom, an electric circuit including a source of current common to said elements, a dry temperature thermostat for making and breaking said circuit, and a humidity control thermostat for simultaneously making said circuit with one element and breaking it with the other.

3. In a humidity and temperature control system for incubators, a vapor producing electric heating element, a dry heat producing electric heating element spaced therefrom, an electric circuit including a source of current common to said elements, a dry temperature thermostat for breaking the circuit to both elements when the dry temperature rises above a predetermined amount and closing the circuit upon falling below said predetermined amount, and a humidity control thermostat in said circuit for simultaneously breaking the circuit to the dry temperature element and making it with the vaporizing element upon the relative humidity falling below a predetermined amount and simultaneously breaking the circuit to the vaporizing element and making it with the dry temperature element upon the relative humidity rising above said predetermined amount.

DEWEY H. HILL.